United States Patent
Bauer et al.

(10) Patent No.: US 6,814,904 B1
(45) Date of Patent: Nov. 9, 2004

(54) METHOD FOR PRODUCING CELLULOSIC FORMS

(75) Inventors: Ralf-Uwe Bauer, Rudolstadt (DE); Frank-Gunter Niemz, Rudolstadt (DE)

(73) Assignee: Zimmer AG, Frankfurt (DE)

( * ) Notice: Subject to any disclaimer, the term of this patent is extended or adjusted under 35 U.S.C. 154(b) by 0 days.

(21) Appl. No.: 09/787,314

(22) PCT Filed: Sep. 14, 1999

(86) PCT No.: PCT/DE99/02977

§ 371 (c)(1),
(2), (4) Date: Aug. 22, 2001

(87) PCT Pub. No.: WO00/17425

PCT Pub. Date: Mar. 30, 2000

(30) Foreign Application Priority Data

Sep. 17, 1998 (DE) .......................... 198 42 557

(51) Int. Cl.[7] .......................... B29C 47/00; D01D 1/10; D01F 2/02; D01F 13/00
(52) U.S. Cl. ...................... 264/37.2; 264/169; 264/187; 264/211
(58) Field of Search ............... 264/37.2, 169, 264/187, 211

(56) References Cited

U.S. PATENT DOCUMENTS

| 5,417,909 | A | | 5/1995 | Michels et al. |
|---|---|---|---|---|
| 5,650,112 | A | | 7/1997 | Zikeli et al. |
| 5,653,931 | A | * | 8/1997 | Eibl et al. .................... 264/187 |
| 5,891,370 | A | | 4/1999 | Connor et al. ............. 264/37.2 |
| 5,904,818 | A | | 5/1999 | Kalt et al. ............. 204/157.71 |
| 5,984,655 | A | | 11/1999 | Schwenninger et al. |
| 6,113,799 | A | | 9/2000 | Mangeng et al. ........... 210/670 |
| 6,245,837 | B1 | * | 6/2001 | Cassel et al. ................. 524/35 |

FOREIGN PATENT DOCUMENTS

DE 286 001 A5 1/1991

* cited by examiner

Primary Examiner—Leo B. Tentoni
(74) Attorney, Agent, or Firm—Marianne Fuierer; Steven J. Hultquist; Yongzhi Yang

(57) ABSTRACT

Process for producing formed cellulosic articles, particularly fibers and filaments, comprising a) dissolving cellulose in an aqueous solution of a tertiary amine oxide, especially N-methyl-morpholine N-oxide, and b) extruding the cellulose solution through an extrusion die via an air gap into a precipitation bath with precipitation of the formed articles, said cellulose solution and/or said precipitation bath containing a tenside, characterized in that in the step b) the tenside content c of the cellulose solution and/or of the precipitation bath is in the range 100 ppm>c>5 ppm, and the width of the air gap is in the range from 2 to 20 mm. With this process the air gap width can be considerably reduced without deterioration of the properties of the fibers/filaments.

18 Claims, No Drawings

METHOD FOR PRODUCING CELLULOSIC FORMS

CROSS-REFERENCE TO RELATED APPLICATIONS

This application is filed under the provisions of 35 USC §371 and claims the priority of International Patent Application No. PCT/DE99/02977 filed Sep. 14, 1999, which in turn claims priority of German Patent Application No. 198 42 557.0 filed Sep. 17, 1998.

The invention relates to a process for producing formed cellulosic articles, particularly fibres and filaments, comprising a) dissolving cellulose in an aqueous solution of a tertiary amine oxide, especially N-methylmorpholine N-oxide, and b) extruding the cellulose solution through an extrusion die via an air gap into a precipitation bath with precipitation of the formed articles, said cellulose solution and/or said precipitation bath containing a tenside.

It is known that with the fibre spinning the risk of mutual contact of the solution jets in the air gap and the danger for the fibres of sticking together is the greater the longer the distance of the spinneret from the precipitation bath surface is. This tendency can be counteracted by decreasing the hole density of the spinneret whereby however the economical efficiency is impaired. From spinning fibres with a great air gap width it is known to obviate this sticking risk by additions to the dope and to improve the spinnability. From DD 218 121 the addition of polyalkylene ether to the cellulose solution is known with air gap widths of 150 mm. According to DD 286 001 a tenside is added when preparing the dope in order to improve the uniformity and the fineness of the thread. From WO 95/16063 a spinning process is known in which tensides are added to the precipitation bath and/or to the dope in order to reduce the fibrillation tendency of the spun fibres. With this process the tenside concentration in the precipitation bath is at least 100 ppm by mass and in the dope is at least 250 ppm by mass. The air gap width amounts to 40 mm.

It is known to carry out the spinning process with smaller widths of the air gap in order to avoid the disadvantages arising with broad air gap widths, and to increase the hole density of the spinneret. Thus, from EP 0 574 870 the spinning of cellulose fibres according to the amine oxide process with stretching the solution jets in an air gap of a width in the range from 2 to 20 mm is known in which the fibres are drawn off through a spinning funnel. With these small gap widths it is found that with decreasing gap width particular textile physical properties of the spun fibres are impaired, and carding results in unsatisfactory products. The consequence is that the decrease of the gap width which is desired per se, is limited by impairing the product properties.

The object of the invention is to provide a process for producing cellulosic formed articles according to the amine oxide process in which the above-mentioned impairments of the product properties caused by narrowing the air gap are avoided. Particularly the air gap width should be diminished compared with known processes without inducing deteriorations or greater fluctuations of particular textile physical properties of the spun fibres or filaments. The aim of the process is also an increase of the hole density without causing sticking of the capillaries together while passing the air gap. Finally the spun fibres should show a better suitability for carding.

With the process mentioned at the beginning these objects are achieved according to the invention in that in the step b) the tenside content c of the cellulose solution and/or of the precipitation bath is in the range from 100 ppm>c v≧5 ppm by mass, and the width of the air gap is in the range from 2 to 20 mm. Surprisingly we have found that with the tenside addition of the invention the air gap width can be considerably reduced without deterioration of the quality of the fibres/filaments or other formed articles. The minimum gap width at which a deterioration of the textile physical properties is not yet observed, can be reduced by approximately 33 to 50%, for example from 6 mm to 3 mm.

Preferably the cellulose solution is extruded through a die having a hole density in the range from 1.8 to 20 mm$^{-2}$. Especially the hole or bore density of the spinneret is in the range from 2.0 to 15 mm$^{-2}$. Compared with the process according to EP 0 574 870 a considerable increase of the hole density with the same air gap width can be achieved without impairing the fibre properties.

According to a preferred embodiment of the process of the invention the tenside content c is in the range from 8 to 70 ppm. Especially the cellulose solution has a tenside content c in the range from 70>c≧30 ppm. The width of the air gap is preferably in the range from 2 to 8 mm. The distance of the solution jets from each other at the exit of the forming die or the spinneret can be likewise reduced. It is preferably in the range from 0.22 to 0.70 mm, especially at 0.5 to 0.6 mm. Consequently the productivity can be enhanced.

According to the preferred embodiment of the process of the invention the tenside is added before the stage a) to the cellulose or in the stage a) or between the stages a) and b). Therefore the tenside can be already introduced in the steps of the pulp preparation or the formation of the dope. The tenside can be simultaneously added with the addition of other auxiliary agents which are to be introduced into the process anyway, such as stabilisers.

With another embodiment of the process the tenside is added after the step b). For example the tenside can be sprayed into the air gap between the forming die and the precipitation bath in the form of aerosols. The tenside can be added to the precipitation bath itself or when regenerating this bath.

Preferably a non-ionogenic tenside is used. Suitable non-ionogenic tensides are e.g. fatty acid or fatty alcohol polyether-oxides and saccharoseester of fatty acids. Suitable anionic tensides are e.g. fatty acid amine compounds or fatty acide alkylamine compunds, fatty acid glyceride sulfate, N-($C_{10-20}$-acyl)sarcosine salts, fatty acid sulfosuccinates and fatty acid amidesulfosuccinates, fatty alcohol sulfates and the ethoxilated derivatives of these compounds. Cationic tensides which are suitable, are e.g. quaternary $C_{10-20}$-alkylammonium compounds. Suitable amphoteric tensides are e.g. N-($C_{10-20}$-alkyl)-β-aminopropionates and fatty acid imidazoline derivatives.

Preferably the precipitation bath from the stage b) is regenerated to form a purified aqueous amine oxide which is reused in the stage a). With this, the tenside in the precipitation bath can be likewise recycled if it is stable under the chemical and thermal conditions of the regeneration and the stage a). If not, the added tenside can be separated from the amine oxide solution in the course of the regeneration of the precipitation bath and reused in step b). The method used for the separation depends inter alia on the type of the tenside. The separation can be carried out e.g. with the aid of an ion exchange membrane, a reverse osmosis membrane or by water vapor distillation. If the tenside is recycled together with the amine oxide it must not promote starting the amine oxide decomposition or the cellulose degradation, and not lower the temperature at which this begins. Furthermore, the dissolving capability of the amine oxide or its hydrate for cellulose should not be reduced.

The process of the invention will now be explained by the examples and the comparative examples.

COMPARATIVE EXAMPLE 1

A 12% cellulose solution in N-methylmorpholine N-oxide monohydrate (NMMO-MH) was spun at a temperature of 85° C. with a spinning velocity of 30 m/min with use of an aqueous precipitation bath containing 20% by mass NMMO. A spinneret having a hole distance of 0.6 mm and a hole density of 2.77 $mm^{-2}$ was used. The air gap was narrowed so far until a distinct negative influence was observed. This was detected when reaching a gap width of 6 mm and became visible inter alia by disturbing the spinning process by beginning turbulences which finally resulted in the break of individual capillaries. The fibres obtained at this gap width were subjected to textile physical tests after having been completely By washed, prepared and dried at 100° C. In addition a carding was carried out, and the fibre sticking points occurring therewith were counted. The results are summarized in the Table.

Example 1

A condensate of 1 mole isotridecylalkohole (ITDA) and 10 moles ethyleneoxide (EO) as a non-ionogenic tenside was added to the spinning bath of the comparative example 1 in a concentration of 10 ppm by mass. The spinning was carried out under the same conditions as in the comparative example 1. It was shown that the gap width could be further decreased. The minimum adjustable gap width was detected to be 3 mm without impairing the spinning process.

Example 2

The procedure was the same as in example 1 with the exception that the ITDA/EO condensate was added in an amount of 30 ppm by mass based on the solution, when preparing the solution. Compared with the tenside-free operation the critical minimum distance between spinneret and bath surface could be likewise decreased from 6 mm to 3 mm.

Example 3

The procedure was the same as in example 1 with the exception that the distance of the spinneret from the surface of the precipitation bath was retained at 6 mm as in the comparative example 1. The obtained fibres were completely washed out, prepared, dried at 100° C. and subjected to the same tests as the fibres of the comparative example 1. The found numerical data are listed in the table.

From the comparison of these numerical values with those of the comparative example 1 can be seen that the uniformity of the textile physical properties which is reflected by the respective variation coefficient increases by the addition of the tenside. The advantage of the process of the invention can be at best recognized by the increase of the loop tenacity. While fibres with a loop tenycity of the value 0 could be detected with fibre samples of the comparative example 1, such values were not found with fibres of this example. This has consequences to the average value of the loop tenacity and also to the variation coefficient. The improvement of the product properties achieved by the process of the invention can be also recognized by the number of sticking points of the carded materials.

COMPARATIVE EXAMPLE 2

A 13% cellulose solution in N-methylmorpholine N-oxide monohydrate was spun with a spinning velocity of 36 m/min from an aqueous precipitation bath containing 25% by mass NMMO. A spinneret with a hole distance of 0.3 mm and a hole density of 11.1 $mm^{-2}$ was used. The air gap was decreased until a distinct negative affect began. This was found at an air gap width of 6 mm and was shown by temporarily sticking several capillaries to each other and troubles of the spinning process due to beginning turbulences which finally resulted in breaking of individual capillaries. The same tests were carried out with the spun fibres as in the comparative example 1. The results are listed in the Table.

Example 4

The procedure is the same as in the comparative example 2 with the exception that 50 ppm by mass dimethyldioctadecylammonium chloride (DMDDAC) was added as a cationic tenside. The spinning was carried out under the conditions specified in comparative example 2 with decreasing the width of the air gap. The adjustable minimum gap width at which impairing the spinning was not yet observed was found to be 4 mm. The spun fibres were subjected to the same tests as in comparative example 2. The results are quoted in the Table.

COMPARATIVE EXAMPLE 3

An 11% cellulose solution in NMMO-MH was spun with a spinning velocity of 30 m/min from an aqueous precipitation bath containing 30% by mass NMMO. A spinneret with a hole distance of 0.6 mm and a hole density of 2.77 $mm^{-2}$ was used. The air gap was so far narrowed until a distinct negative effect began. This was detected when the width of the air gap was 8 mm, and was shown by troubles of the spinning procedure due to turbulences which finally resulted in the break of particular capillaries. The same tests as in the comparative example 1 were carried out at the fibres not yet affected. The results are listed in the Table.

Example 5

The procedure was the same as in the comparative example 3 with the exception that 50 ppm by mass sodium salt of dodecylbenzene sulfonic acid (DDBSS) as an anionic tenside was added to the spinning bath. The width of the air gap was continuously decreased during the spinning. The minimum adjustable gap width at which the spinning process was not yet affected was found to be 4 mm. The same fibre tests as in the comparative example 3 were carried out. The results are quoted in the Table.

TABLE

| Parameter, | Unit | Comp. Example 1 | Example 3 | Comp. Example 2 | Example 4 | Comp. Example 3 | Example 5 |
| --- | --- | --- | --- | --- | --- | --- | --- |
| Tenacity, dry | cN/tex | 41.2 | 43.8 | 41.2 | 42.9 | 43.6 | 45.3 |
| Variation coefficient | % | 20.4 | 13.6 | 18.3 | 11.5 | 20.3 | 10.5 |
| Tenacity, wet | cN/tex | 34.2 | 35.3 | 33.2 | 34.8 | 36.2 | 37.4 |

TABLE-continued

| Parameter, | Unit | Comp. Example 1 | Example 3 | Comp. Example 2 | Example 4 | Comp. Example 3 | Example 5 |
|---|---|---|---|---|---|---|---|
| Variation coefficient | % | 22.8 | 14.8 | 20.8 | 12.3 | 16.5 | 16.0 |
| Elongation, dry | % | 14.3 | 14.2 | 13.7 | 14.0 | 14.0 | 14.6 |
| Elongation, wet | % | 15.8 | 15.3 | 14.8 | 15.2 | 14.9 | 15.2 |
| Loop tenacity | cN/tex | 12.7 | 14.6 | 13.5 | 15.6 | 12.5 | 14.2 |
| Variation coefficient | % | 26.6 | 14.8 | 21.0 | 13.5 | 19.6 | 11.5 |
| Counted sticking points per 500 g carded material | | 13 | 4 | 14 | 6 | 12 | 7 |

What is claimed is:

1. A process for producing formed cellulosic articles, particularly fibres and filaments, comprising:
    a) dissolving cellulose in an aqueous solution of N-methylmorpholine N-oxide (NMMO) to form a solution of cellulose and NMMO, and
    b) extruding the solution of cellulose and NMMO through an extrusion die via an air gap into a precipitation bath with precipitation of the formed articles, wherein said solution of cellulose and NMMO and/or said precipitation bath containing a tenside, characterized in that in the step b) the tenside content c of the solution of cellulose and NMMO and/or of the precipitation bath is in the range 100 ppm>c≧5 ppm, and the width of the air gap is in the range from 2 to 20 mm.

2. The process according to claim 1 wherein the tenside content c is in the range from 8 to 70 ppm.

3. The process according to claim 1 wherein the tenside content c in the solution of cellulose and NMMO is in the range 70 ppm>c≧30 ppm.

4. The process according to claim 1 wherein the width of the air gap is in the range from 2 to 8 mm.

5. The process according to claim 1 wherein the distance of the solution jets from each other at the exit of the extrusion die is in the range from 0.22 to 0.7 mm.

6. The process according to claim 1 wherein the tenside is added to the solution of cellulose and NMMO at a time selected from the group consisting of before the stage a), in the stage a), and between the stages a) and b).

7. The process according to claim 1 wherein the tenside is added to the solution of cellulose and NMMO at a time selected from the group consisting of in stage b), and after the stage b).

8. The process according to claim 1 wherein a non-ionogenic tenside is used.

9. The process according to claim 1 wherein the precipitation bath from the stage b) is regenerated to a purified aqueous amine oxide which is reused in the stage a).

10. The process according to claim 9 wherein the tenside is separated from the amine oxide solution in the course of the regeneration of the precipitation bath, and is reused in the stage b).

11. The process according to claim 1 wherein the solution of cellulose and NMMO is extruded through a die having a hole density in the range from 1.8 to 20 $mm^{-2}$.

12. A process for producing formed cellulosic articles, particularly fibres and filaments, comprising:
    a) dissolving cellulose in an aqueous solution of a tertiary amine oxide, and
    b) extruding the cellulose solution through an extrusion die via an air gap into a precipitation bath with precipitation of the formed articles, said cellulose solution containing a tenside in a range from about 10 ppm to about 50 ppm.

13. The process according to claim 12 further comprising a tenside in the precipitation bath.

14. The process according to claim 12 wherein the width of the air gap is in the range from 2 to 20 mm.

15. The process according to claim 12 wherein the tertiary amine oxide is N-methylmorpholine N-oxide.

16. A process for producing formed cellulosic articles, particularly fibres and filaments, comprising:
    a) dissolving cellulose in an aqueous solution of a tertiary amine oxide, and p1 b) extruding the cellulose solution through an extrusion die via an air gap into a precipitation bath with precipitation of the formed articles, said precipitation bath containing a tenside, characterized in that in the step b) the tenside content of the precipitation bath is in the range from 10 ppm to about 30 ppm.

17. The process according to claim 16 wherein the width of the air gap is in the range from 2 to 20 mm.

18. The process according to claim 16 wherein the tertiary amine oxide is N-methylmorpholine N-oxide.

* * * * *

UNITED STATES PATENT AND TRADEMARK OFFICE
CERTIFICATE OF CORRECTION

PATENT NO.   : 6,814,904 B1
DATED        : November 9, 2004
INVENTOR(S)  : Bauer et al.

It is certified that error appears in the above-identified patent and that said Letters Patent is hereby corrected as shown below:

Column 3,
Line 21, delete "By"

Column 6,
Line 39, delete "p1"

Signed and Sealed this

Nineteenth Day of April, 2005

JON W. DUDAS
*Director of the United States Patent and Trademark Office*